United States Patent
Harada

(10) Patent No.: US 9,797,577 B2
(45) Date of Patent: Oct. 24, 2017

(54) WAVELENGTH CONVERTING DEVICE, METHODE FOR MANUFACTURING THE SAME AND LIGHTING UNIT USING THE SAME

(71) Applicant: Stanley Electric Co., Ltd., Tokyo (JP)

(72) Inventor: Mitsunori Harada, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 136 days.

(21) Appl. No.: 14/985,563

(22) Filed: Dec. 31, 2015

(65) Prior Publication Data
US 2016/0195244 A1 Jul. 7, 2016

(30) Foreign Application Priority Data
Jan. 7, 2015 (JP) .................................. 2015-001444

(51) Int. Cl.
*F21V 13/14* (2006.01)
*G02B 5/20* (2006.01)
(Continued)

(52) U.S. Cl.
CPC .............. *F21V 13/14* (2013.01); *F21K 9/64* (2016.08); *F21S 48/1145* (2013.01);
(Continued)

(58) Field of Classification Search
CPC .......... F21V 11/16; F21V 11/04; F21V 11/08; F21V 11/06; F21V 11/10; F21K 9/64
See application file for complete search history.

(56) References Cited

U.S. PATENT DOCUMENTS 8,956,025 B2  2/2015  Kushimoto
2005/0185151 A1* 8/2005 Koba .................. F21V 11/04
                                                  353/97
(Continued)

FOREIGN PATENT DOCUMENTS

EP     2 781 409 A1   9/2014
JP    2009-266437 A   11/2009
(Continued)

OTHER PUBLICATIONS

The extended European search report for the related European Patent Application No. 15203016.9 dated Mar. 8, 2016.

*Primary Examiner* — Andrew Coughlin
*Assistant Examiner* — Christopher E Dunay
(74) *Attorney, Agent, or Firm* — Kenealy Vaidya LLP

(57) ABSTRACT

A wavelength converting device, a method for manufacturing the device and a lighting unit using the device can emit various color lights. The converting device can include a substrate, a filter disposed on the substrate and the wavelength converting layer including a plurality of wavelength converting chips disposed on the filter, and can be manufactured by almost cutting process. The lighting unit using the device includes a laser device, a movable mirror and a controller, which enables the laser device to generate a pulsed laser beam and enables the movable mirror to scan the pulsed laser beam into a respective one of the wavelength converting chips. Thus, the disclosed subject matter can provide the wavelength converting device, which can form various colored light distribution patterns including a white light to use for a headlight and the like, and can provide methods for efficiently manufacturing such the devices with high accuracy.

20 Claims, 9 Drawing Sheets

(51) Int. Cl.
  *F21V 9/16* (2006.01)
  *F21S 8/10* (2006.01)
  *F21K 9/64* (2016.01)
  *F21V 14/04* (2006.01)
  *F21Y 115/30* (2016.01)
  *F21Y 115/10* (2016.01)

(52) U.S. Cl.
  CPC ....... *F21S 48/1317* (2013.01); *F21S 48/1757* (2013.01); *F21V 9/16* (2013.01); *G02B 5/20* (2013.01); *F21V 14/04* (2013.01); *F21Y 2115/10* (2016.08); *F21Y 2115/30* (2016.08)

(56) References Cited

U.S. PATENT DOCUMENTS

| | | | |
|---|---|---|---|
| 2006/0087619 A1* | 4/2006 | Kim | G02B 3/06 353/31 |
| 2009/0101930 A1 | 4/2009 | Li | |
| 2015/0175054 A1 | 6/2015 | Yatsuda | |
| 2016/0131321 A1* | 5/2016 | Yamanaka | F21S 48/1145 362/513 |
| 2017/0097561 A1* | 4/2017 | Komatsu | G03B 21/204 |
| 2017/0138570 A1* | 5/2017 | Ouderkirk | F21V 7/00 |
| 2017/0184254 A1* | 6/2017 | Yamashita | F21K 9/64 |

FOREIGN PATENT DOCUMENTS

| | | |
|---|---|---|
| JP | 2013-102078 A | 5/2013 |
| WO | 2013/094221 A1 | 6/2013 |

\* cited by examiner

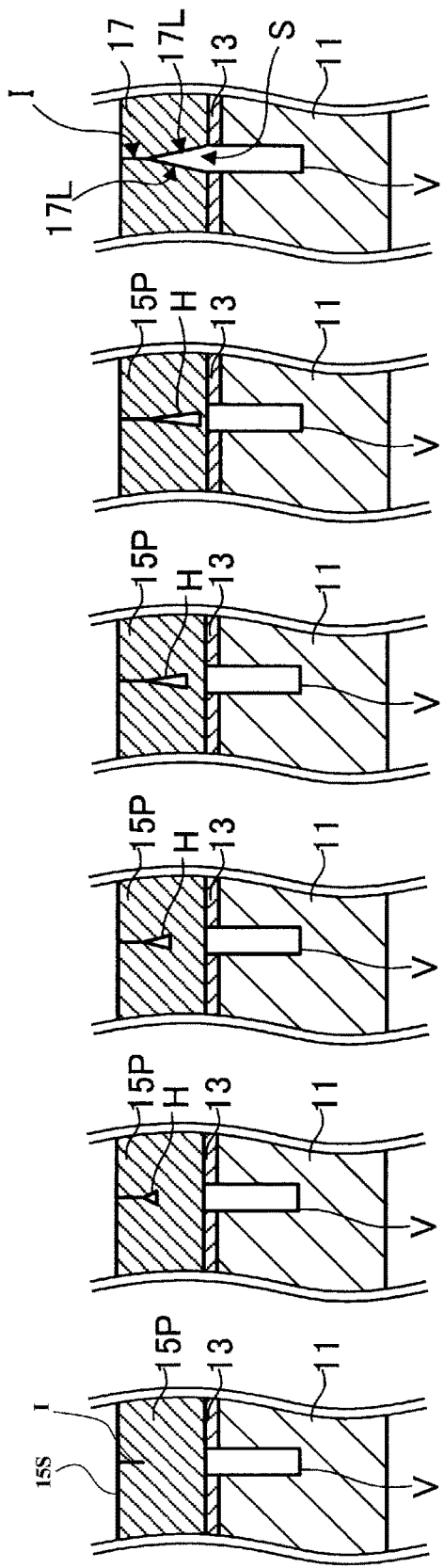

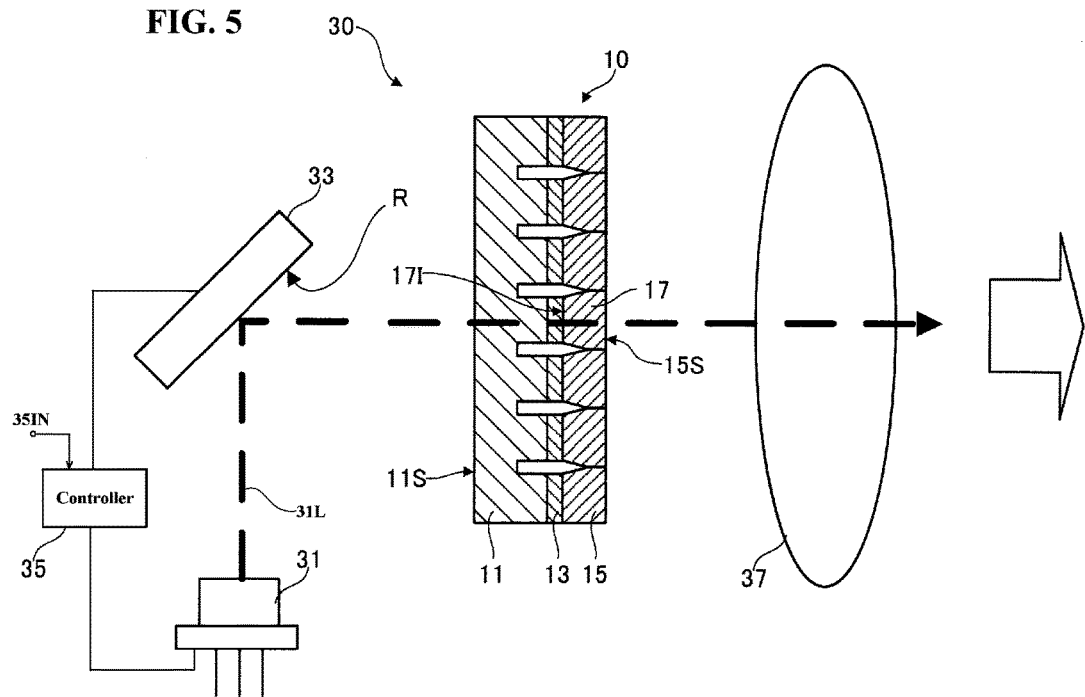

WAVELENGTH CONVERTING DEVICE, METHODE FOR MANUFACTURING THE SAME AND LIGHTING UNIT USING THE SAME

This application claims the priority benefit under 35 U.S.C. §119 of Japanese Patent Application No. 2015-001444 filed on Jan. 7, 2015, which is hereby incorporated in its entirety by reference.

BACKGROUND

1. Field

The presently disclosed subject matter relates to wavelength converting devices, methods for manufacturing the wavelength converting devices and lighting units using the wavelength converting devices. More particularly, the presently disclosed subject matter relates to the wavelength converting devices that can provide favorable light distribution patterns having various colure lights including a substantially white color light by scanning a laser beam, the methods for efficiently manufacturing such the devices with high accuracy, and relates to the lighting units using such the devices that can also emit a large amount of light intensity having a high light-efficiency, and which can emit the various color lights having a high color uniformity in order to be able to use for a stage light, a street light, a projector, a vehicle light, a spot light, etc.

2. Description of the Related Art

Semiconductor light-emitting devices, in which a part of light emitted from a semiconductor light-emitting chip is converted into light having a different wavelength by a wavelength converting layer and in which a mixture light including the light having the different wavelength mixed with the light emitted directly from the light-emitting chip is emitted, have been used as a light source for various lighting units such as a vehicle headlight. When the semiconductor light-emitting devices is used as a light source for a headlight, the semiconductor light-emitting devices may locate each of the semiconductor light-emitting chip and the wavelength converting layer at a different position and may emit a substantially white light toward a road in accordance with a design and the like of the headlight.

A conventional headlight having such a structure is disclosed in Patent document No. 1 (Japanese Patent Application Laid Open JP2009-266437). FIG. 8a is a schematic cross-sectional view depicting the conventional headlight disclosed in Patent document No. 1. The conventional headlight 90 includes: a first casing 95; a second casing 96; a semiconductor light-emitting chip 92 located underneath the first casing 95 so as to emit light in downward direction of the first casing 95; a wavelength converting layer 91a including a filter 91b to select a wavelength, formed in a planar shape, and attached to the first casing 95; and a first reflector 93 located underneath the first casing 95, facing the semiconductor light-emitting chip 92 and the filter 91b included underneath the wavelength converting layer 91a, and the light emitted from the semiconductor light-emitting chip 92 passing though the wavelength converting layer 91a via the filter 91b after reflecting the light with the first reflector 93, and thereby the light changing to a mixture light having a substantially white color tone, which includes a part of the light emitted directly from the semiconductor light-emitting chip 92 mixed with a wavelength-converted light having a different wavelength from another of the light.

In addition, the conventional headlight 90 also includes: a second reflector 94 attached on the first casing 95 so as to be located in an opposite direction of the first reflector 93 with respect to the wavelength converting layer 91a, and thereby the mixture light, which is emitted from the wavelength converting layer 91a after the reflective light from the first reflector 93 passes from the filer 91b across the wavelength converting layer 91a, reflecting in an opposite direction of the semiconductor light-emitting chip 92 and in a direction toward the second casing 96; and a projector lens 97 attached to the second casing 96, and the mixture light being emitted from the projector lens 97 in a frontward direction of the headlight 90.

When the semiconductor light-emitting chip 92 is a blue light-emitting diode (LED) emitting blue light and when the wavelength converting layer 91a is a yellow phosphor such as yttrium aluminum garnet (YAG), the conventional headlight 90 may emit the mixture light having a substantially white color tone due to an additive color mixture of a part of the blue light emitted from the blue LED and yellow light excited by the yellow phosphor using another part of the blue light as an exciting light. More specifically, a method for emitting the mixture light having the substantially white color tone in the conventional headlight 90 will now be described with reference to FIG. 8b, which is an explanatory view to explain the method for emitting the mixture light having the substantially white color tone in the conventional headlight 90.

The FIG. 8b revises a relation between the semiconductor light-emitting chip 92 and the wavelength converting layer 91a as a linear structure without the first reflector 93 to facilitate an understanding of the method in Patent document No. 1. In blue light 98B emitted from the semiconductor light-emitting chip 92, the substantially whole blue light 98B may enter into the wavelength converting layer 91a via the filter 91b, and may vary a mixture light 99M having the substantially white color tone due to an additive color mixture of the part of the blue light 98B and yellow light 98Y excited by the wavelength converting layer 91a including the yellow phosphor using another part of the blue light 98B as the exciting light.

In this case, a partial light 98BY of the blue light 98B may reflect from the wavelength converting layer 91a toward the filter 91b. Hence, the light 98BY may return into the wavelength converting layer 91a by reflecting the light 98BY using the filter 91b, and thereby the conventional headlight 90 may improve a light-emitting efficiency thereof. However, because the light 98BY may reflect on a bottom surface of the wavelength converting layer 91a and also reflect on a top surface of the filer 91b, the light 98BY may become multipath reflection light.

Accordingly, the mixture light emitted from the top surface of the wavelength converting layer 91a may become white color light having yellow-tinged light on peripheral region of the wavelength converting layer 91a. When the white color light having yellow-tinged light on peripheral region of the wavelength converting layer 91a is enlarged and projected from the projector lens 97 via the second reflector 94, the conventional headlight 90 may project the white color light having a color variation such as a yellow ring toward a road, although the conventional headlight 90 may improve the light-emitting efficiency thereof. Therefore, the conventional headlight 90 may not necessarily provide a favorable light distribution for drivers of subject vehicles, oncoming vehicles, etc.

A conventional semiconductor light-emitting apparatus, which may prevent the above-described color variation, is disclosed in Patent document No. 2 (Japanese Patent Application Laid Open JP2013-102078), which is owned by Applicant of this disclosed subject matter. FIG. 9 is a schematic explanatory perspective view showing the conventional semiconductor light-emitting apparatus disclosed in Patent document No. 2. The conventional semiconductor light-emitting apparatus 80 includes: a semiconductor light source 85 having a light beam diameter 85D, and a wavelength converting plate 82 including a plurality of wavelength converting chips 87 and a plurality of plates 86, which divides the wavelength converting plate 82 into the plurality of wavelength converting chips 87.

In the conventional semiconductor light-emitting apparatus 80, a diameter 85D of the light beam emitted from the semiconductor light source 85 becomes smaller than each of widths in directions of X-direction and Y-direction of each of the wavelength converting chips 87 so that the light beam emitted from the semiconductor light source 85 can enter into each of incident surfaces of the wavelength converting chips 87. Additionally, the plurality of plates 86 are made from a metallic plate having a high reflectivity such as a silver, aluminum and the like so that the light beam entering into each of the incident surfaces of the wavelength converting chips 87 may be emitted from a respective one of light-emitting surfaces of the wavelength converting chips 87. Thereby, the conventional semiconductor light-emitting apparatus 80 may prevent the above-described color variation such as the yellow ring.

Recently, vehicle headlights using a semiconductor light source and a mirror that can provide various light distribution patterns for drivers and headlight systems using the headlights that can vary a light distribution pattern so that the drivers can drive a motor vehicle safely in accordance with surroundings such as an oncoming vehicle, a forward travelling vehicle, a road and the like have been developed. Such a headlight system is disclosed, for example, in Patent document No. 3, which is owned by Applicant of this disclosed subject matter.

When the vehicle headlights use a semiconductor light source and a mirror to provide various light distribution patterns for the drivers, light emitted from the semiconductor light source may scan on the wavelength converting plate 82 including the plurality of wavelength converting chips 87. In this case, a part of the light emitted from the semiconductor light source hits on the plurality of plate 86 and may return toward the semiconductor light source. Accordingly, when the vehicle headlights having such a structure, in which the light scans on the wavelength converting plate 82, use the wavelength converting plate 82 including the plurality of wavelength converting chips 87, the vehicle headlights may decrease a light-emitting efficiency thereof.

The above-referenced Patent Documents and an additional document are listed below, and are hereby incorporated with their English abstracts in their entireties.

1. Patent document No. 1: Japanese Patent Application Laid Open JP2009-266437
2. Patent document No. 2: Japanese Patent Application Laid Open JP2013-102078
3. Patent document No. 3: U.S. Pat. No. 8,956,025
4. Patent document No. 4: U.S. patent application Ser. No. 14/583,587

The disclosed subject matter has been devised to consider the above and other problems, characteristics and features. Thus, embodiments of the disclosed subject matter can include various wavelength converting devices, which can provide various desirable light distribution patterns by scanning a laser beam using a movable mirror. In this case, the wavelength converting devices can emit various color lights including a substantially white color light having a high light-efficiency and high color uniformity. In addition, the embodiments of the disclosed subject matter can include methods for efficiently manufacturing such the wavelength converting devices with high accuracy, and also can include lighting units using the wavelength converting devices that can also emit a large amount of light intensity having a high light-efficiency, and which can emit the various color lights having a high color uniformity.

SUMMARY

The presently disclosed subject matter has been devised in view of the above and other characteristics, desires, and problems in the conventional art. An aspect of the disclosed subject matter can include providing transmission type wavelength converting devices and reflective type wavelength converting devices, which can provide various desirable light distribution patterns by scanning a laser beam using a movable mirror. One of other aspects of the disclosed subject matter can include providing methods for efficiently manufacturing the above-described wavelength converting devices with high accuracy. Additionally, another of other aspects of the disclosed subject matter can include providing lighting units using such the devices that can also emit a large amount of light intensity having a high light-efficiency, and which can emit various color lights having a high color uniformity in order to be able to use for a stage light, a street light, a projector, a vehicle light, a spot light, etc.

According to one aspect of the disclosed subject matter, a wavelength converting device can include: a transparent substrate formed in a substantially planar shape, and including a grid-like groove into the transparent substrate from a direction of a substrate top surface thereof, and the grid-like groove extending along a substrate side surface thereof; a dichroic filter disposed on the substrate top surface of the transparent substrate; and a wavelength converting layer disposed on the filter top surface of the dichroic filter, and divided into a plurality of wavelength converting chips each having a boundary end located in the wavelength converting layer, each of side surfaces of the adjacent wavelength converting chips substantially contacting with respect to each other, and therefore forming a boundary between a light-emitting surface corresponding to a top surface of the wavelength converting layer and the boundary end, and each of the side surfaces of the adjacent wavelength converting chips facing with respect to each other, separating between the boundary end and the grid-like groove of the transparent substrate, and therefore forming a space between the boundary end and the grid-like groove, and the space enlarging from the boundary end toward the grid-like groove in an extending direction of the grid-like groove of the transparent substrate.

When the above-described wavelength converting device is used as a reflective type device, the light-emitting surface can also be used as an incident surface, and also the grid-like groove may be removed from the transparent substrate. Additionally, the space between the boundary end and the grid-like groove may also be removed from the dichroic filter and wavelength converting layer by extending the boundary instead of the space.

In the above-described exemplary wavelength converting devices, the boundary between the side surfaces of the adjacent wavelength converting chips can extend toward the transparent substrate at a substantially right angle, and also the transparent substrate can includes at least one of a sapphire and a glass. The wavelength converting layer can include at least one of an yellow phosphor, a red phosphor, a green phosphor and a blue phosphor so as to emit various color lights from the light-emitting surface.

Another aspect of the disclosed subject matter includes methods for manufacturing the above-described wavelength converting devices. An exemplary method can include: preparing the transparent substrate, and forming the dichroic filter on the top surface of the transparent substrate; forming the grid-like groove into the transparent substrate from a direction of the top surface via the dichroic filter; attaching the wavelength converting layer on a top surface of the dichroic filter; and cutting the wavelength converting layer on the dichroic filter into the grid-like groove, and dividing the wavelength converting layer into the plurality of wavelength converting chips.

According to the exemplary method, good part of the process for manufacturing the wavelength converting devices can be carried out by using a blade, a laser device emitting a laser beam and the like for cutting process. Accordingly, the disclosed subject matter can provide methods for efficiently manufacturing the above-described wavelength converting devices with high accuracy.

Another of the other aspects of the disclosed subject matter includes lighting units using one of the wavelength converting devices. The exemplary transmission type lighting unit can include: a laser device configured to emit a laser beam and a diameter of the laser beam emitted from the laser device being smaller than each size of chip incident surfaces of the wavelength converting chips; a Micro Electro Mechanical System (MEMS) mirror having a reflective surface configured to rotate in two-axis directions intersecting at a substantially right angle, being located adjacent the laser device, the reflective surface facing the laser device and receiving the laser beam in an operation of the laser device, facing an incident surface of the wavelength converting device, and reflecting the laser beam received from the laser device toward the incident surface, and thereby the laser beam emitted from the laser device being possible to enter into a respective one of the chip incident surfaces of the wavelength converting chips via the reflective surface of the MEMS mirror; an optical lens facing the light-emitting surface of the wavelength converting device, receiving the laser beam from the light-emitting surface and projecting the laser beam in an opposite direction of the wavelength converting device; and a controller configured to control the laser device for forming the laser beam in a pulsed shape and for emitting the pulsed laser beam toward the reflective surface, and configured to control the reflective surface of the MEMS mirror for scanning the pulsed laser beam received from the laser device toward the respective one of the chip light-emitting surfaces of the wavelength converting chips.

According to the above-described exemplary lighting unit, the controller can enable the laser device to pulse-drives the pulsed laser beam and also can enable the MEMS mirror to sequentially rotate the reflective mirror, while the reflective mirror is synchronized with the pulsed laser beam, so that the reflective mirror can scan the pulsed laser beam on the respective one of the chip incident surfaces of the wavelength converting chips. The light-emitting surface can emit a mixture light having a high light-emitting efficiency and a high color uniformity toward the optical lens by using each of the side surfaces of the adjacent wavelength converting chips as the reflector, which enlarges toward the light-emitting surface of the wavelength converting layer, so that the mixture light may not leak from the respective one of the wavelength converting chips.

In addition, when the mixture light is emitted from the one of the adjacent wavelength converting chips and when the mixture light is not emitted from the other of the adjacent wavelength converting chips, because the mixture light emitted from the one of the adjacent wavelength converting chips does not leak toward the other of the adjacent wavelength converting chips, the wavelength converting device can enable the mixture light to be emitted from an intended chip of the wavelength converting chips.

Thus, the disclosed subject matter can provide the wavelength converting devices, which can provide various desirable light distribution patterns by scanning a laser beam using a movable mirror, and also can provide lighting units using such the devices that can also emit a large amount of light intensity having a high light-efficiency, and which can emit various color lights having a high color uniformity in order to be able to use for a stage light, a street light, a projector, a vehicle light, a spot light, etc.

BRIEF DESCRIPTION OF THE DRAWINGS

These and other characteristics and features of the disclosed subject matter will become clear from the following description with reference to the accompanying drawings, wherein:

FIG. 1b is a schematic cross-sectional view showing the wavelength converting device taken along Line 2-2 in FIG. 1a;

FIGS. 4a to 4f are schematic partial enlarged cross-sectional views depicting each of six steps using a laser beam in Process (D) shown in FIG. 2d, respectively;

FIG. 5 is a schematic structural view depicting a first exemplary embodiment of a lighting unit using the wavelength converting device made in accordance with principles of the disclosed subject matter;

DETAILED DESCRIPTION OF EXEMPLARY EMBODIMENTS

Figure 1A:
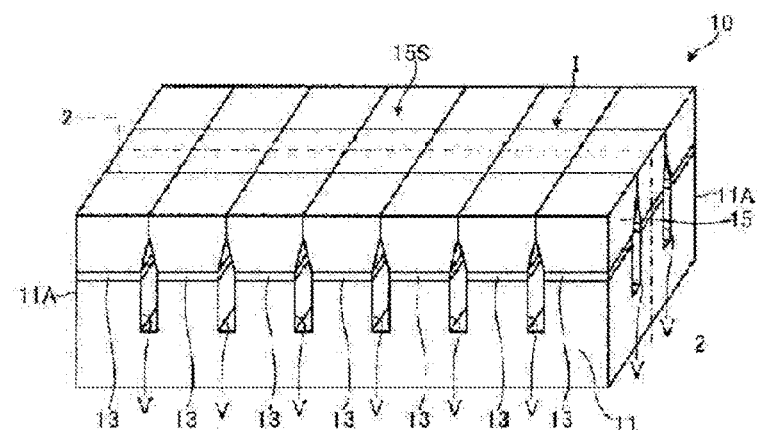
FIG. 1a is a schematic perspective view showing an exemplary embodiment of a wavelength converting device made in accordance with principles of the disclosed subject matter.
Figure 1B:
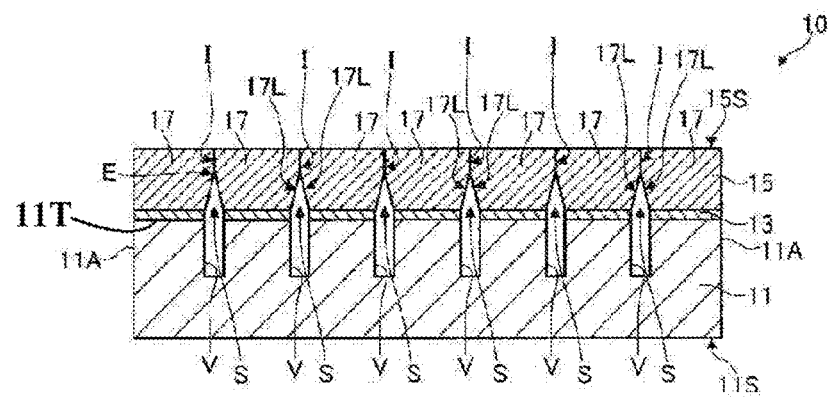

The disclosed subject matter will now be described in detail with reference to FIGS. 1a to 7b, in which the same or corresponding elements use the same reference marks. FIG. 1a is a schematic perspective view showing an exemplary embodiment of a wavelength converting device made in accordance with principles of the disclosed subject matter, and FIG. 1b is a schematic cross-sectional view showing the wavelength converting device taken along Line 2-2 in FIG. 1a.

The wavelength converting device 10 can include: a transparent substrate 11 having an incident surface 11S, a substrate top surface 11T and a substrate side surface 11A formed in a substantially planar shape, and including a grid-like groove V into the transparent substrate 11 from a direction of the substrate top surface 11T, and the grid-like groove V extending along the substrate side surface 11A; a dichroic filter 13 having a filter top surface 13T disposed on the substrate top surface 11T of the transparent substrate 11; and a wavelength converting layer 15 having a light-emitting surface 15S disposed on the filter top surface 13T of the dichroic filter 13, and including a plurality of wavelength converting chips 17 each having a side surface 17L, each of the side surfaces 17L of the adjacent wavelength converting chips 17 substantially contacting with respect to each other, and therefore forming a boundary I between the light-emitting surface 15S corresponding to a top surface of the wavelength converting layer 15 and a boundary end E, which is located in the wavelength converting layer 15, and each of the side surfaces 17L of the adjacent wavelength converting chips 17 substantially separating so as to face with respect to each other between the boundary end E and the grid-like groove V of the transparent substrate 11, and therefore forming a space S between the boundary end E and the grid-like groove V of the transparent substrate 11, and the space S enlarging from the boundary end E toward the grid-like groove V of the transparent substrate 11 in an extending direction of the grid-like groove V.

Here, each of the above-described elements will now be described in detail. The transparent substrate 11 can be composed of a transparent material such as a sapphire, a glass and the like, and can be a substrate having a thickness of approximately 550 micro meters. According to optical characteristics of a light-emitting chip and the like as described later, the thickness of the transparent substrate 11 can be from 0.3 millimeters to 2.0 millimeters, and the incident surface 11S of the transparent substrate 11 can receive light emitted from the light-emitting chip.

The grid-like groove V can be formed from the substrate top surface 11T toward the incident surface 11S of the transparent substrate 11 and can extend along the substrate side surface 11A of the transparent substrate 11. A width of the grid-like groove V can be approximately 50 micro meters and a depth thereof can be from 0.5 millimeters to 1.0 millimeter.

The dichroic filter 13, which is disposed on the substrate top surface 11T of the transparent substrate 11, can be made from a multi dielectric layer as a wavelength selecting layer, which may transmit the light received from the incident surface 11S of the transparent substrate 11 toward the wavelength converting layer 15 and may return light reflected from the wavelength converting layer 15 toward the wavelength converting layer 15 by reflecting the light on the filter top surface 13T thereof. The dichroic filter 13 can be formed in a matrix shape because the grid-like groove V passes through the dichroic filter 13.

The wavelength converting layer 15, which is disposed on the filter top surface 13T of the dichroic filter 13, can be made by mixing at least one of a yellow phosphor, a red phosphor, a green phosphor and a blue phosphor with a transparent resin such as a silicone resin, etc. When the light-emitting chip is a blue laser diode emitting a blue laser beam and when the wavelength converting layer 15 includes the yellow phosphor such as yttrium aluminum garnet (YAG), the wavelength converting device 10 may emit a mixture light having a substantially white color tone from the light-emitting surface 15S of the wavelength converting layer 15 due to an additive color mixture of a part of the blue laser beam and yellow light excited by the yellow phosphor using another part of the blue laser beam as an exciting light.

In this case, when each of the part of the blue light and the excited yellow light reaches each of the side surfaces 17L of the adjacent wavelength converting chips 17, each of the part of the blue laser beam and the excited yellow light may reflect on each of the side surfaces 17L of the adjacent wavelength converting chips 17 and can be efficiently emitted from the light-emitting surface 15S of the wavelength converting layer 15 as the mixture light by using each of the side surfaces 17L of the adjacent wavelength converting chips 17 as a reflector, which enlarges toward the light-emitting surface 15S of the wavelength converting layer 15, so that the mixture light may not leak from a respective one of the wavelength converting chips 17.

In addition, when the mixture light is emitted from one of the adjacent wavelength converting chips 17 and when the mixture light is not emitted from another of the adjacent wavelength converting chips 17, because the mixture light emitted from the one of the adjacent wavelength converting chips 17 does not leak from the other of the adjacent wavelength converting chips 17, the wavelength converting device 10 can enable the mixture light to be emitted from an intended chip of the wavelength converting chips 17 via the light-emitting surface 15S of the wavelength converting layer 15.

Moreover, when the blue laser beam reaches an outer side surface of the grid-like groove V after the blue laser beam is entered from the incident surface 11S into the transparent substrate 11, because the blue laser beam reached on the outer side surface of the grid-like groove V may totally reflect on the outer side surface of the grid-like groove V toward the respective one of the wavelength converting chips 17, the wavelength converting device 10 can enable the blue laser beam to be emitted from the intended chip of the wavelength converting chips 17 as the mixture light via the light-emitting surface 15S of the wavelength converting layer 15.

Each of the adjacent wavelength converting chips 17 is divided by the boundary I between the light-emitting surface 15S corresponding to the top surface (15S) of the wavelength converting layer 15 and the boundary end E, which is located in the wavelength converting layer 15. Therefore, when the blue laser beam is entered from the incident surface 11S into the transparent substrate 11, the wavelength converting device 10 can enable the mixture light to be emitted from the light-emitting surface 15S of the wavelength converting layer 15 at high light-emitting efficiency and high color uniformity while a mixture light directed toward the transparent substrate 11 returns toward the light-emitting surface 15S with the dichroic filter 13 by using each of the side surfaces 17L of the adjacent wavelength converting chips 17 as the reflector, which enlarges toward the light-emitting surface 15S of the wavelength converting layer 15, so that each of variations of light-emitting intensity and colure tone may not occur even at the boundary end E.

Furthermore, when the light-emitting chip is an ultraviolet laser diode emitting an ultraviolet laser beam and when the wavelength converting layer 15 includes the red phosphor such as $CaAlSiN_3:Eu^{2+}$, the green phosphor such as $(Si, Al)_6(O, N)_8:Eu^{2+}$, and the blue phosphor such as $(Sr, Ca, Ba, Mg)_{10}(PO_4)_6C_{12}:Eu^{2+}$, the wavelength converting device 10 may emit various mixture lights including a substantially white light from the light-emitting surface 15S of the wavelength converting layer 15 in accordance with an additive color mixture ratio of excited red, green and blue lights. Thus, the disclosed subject matter can provide wavelength converting devices, which can provide various color lights having a high color uniformity, and which can also emit a large amount of light intensity having a high light-efficiency.

Next, an exemplary method for manufacturing the wavelength converting device 10 will now be described with reference to FIG. 2a to FIG. 4f.

Figure 2A:
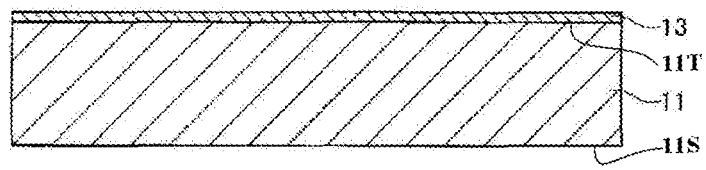
FIGS. 2a to 2d are schematic structural cross-sectional views showing Processes (A), (B), (C) and (D) in an exemplary method for manufacturing the wavelength converting device shown by FIGS. 1a and 1b, respectively.

Process (A) is preparing the transparent substrate 11, and forming the dichroic filter 13 on the top surface 11T of the transparent substrate 11 as shown in FIG. 2a.

Figure 2B:
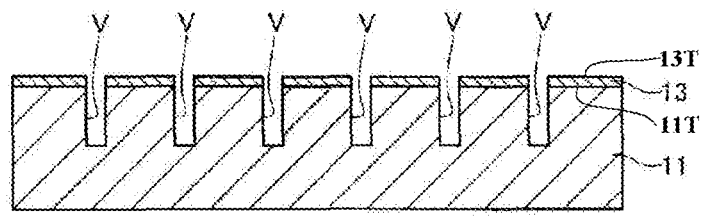
Figure 2C:
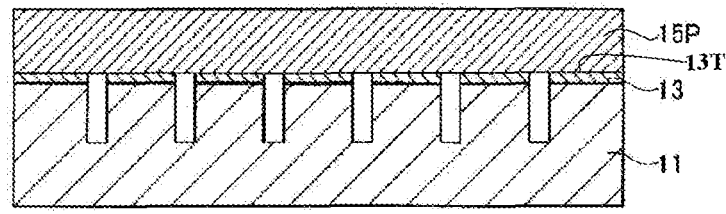

Process (B) is forming a grid-like groove V into the transparent substrate 11 from a direction of the top surface 11T via the dichroic filter 13 by a wet etching, a dry etching, dying, etc. as shown in FIG. 2b Process (C) is attaching the wavelength converting layer 15P on the top surface 13T of the dichroic filter 13 as shown in FIG. 2c. When the wavelength converting layer 15P is used as a yellow-converting layer including a yellow phosphor, the wavelength converting layer 15P can be strongly attached on the top surface 13T of the dichroic filter 13 by using a semi-solidified phosphor sheet, which is made by mixing a yellow phosphor such as YAG with a transparent resin such as a silicone resin, etc.

Figure 2D:
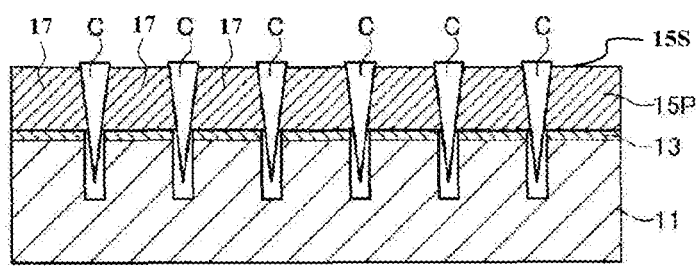

Process (D) is cutting the wavelength converting layer 15P formed in a sheet-shape on the dichroic filter 13 into the grid-like groove V, which is formed in the transparent substrate 11 and the dichroic filter 13, by using a blade C such as an etching typed blade (pinnacle blade), a vix typed blade (thomson blade) and the like, and is dividing the wavelength converting layer 15P into the plurality of wavelength converting chips 17 as shown in FIG. 2d. In this case, the blade C can be inserted from the top surface (15S) of the wavelength converting layer 15P into the grid-like groove V at a substantially right angle with reference to the top surface 11T of the transparent substrate 11, and can be pulled along a substantially reversed route with respect to the above-described inserting route. However, when the boundary I is inclined with reference to the top surface 11T of the transparent substrate 11, the blade C cannot necessarily be inserted from the top surface 15S of the wavelength converting layer 15P into the grid-like groove V at the substantially right angle with reference to the top surface 11T of the transparent substrate 11.

Figures 3A, 3B, 3C, 3D:
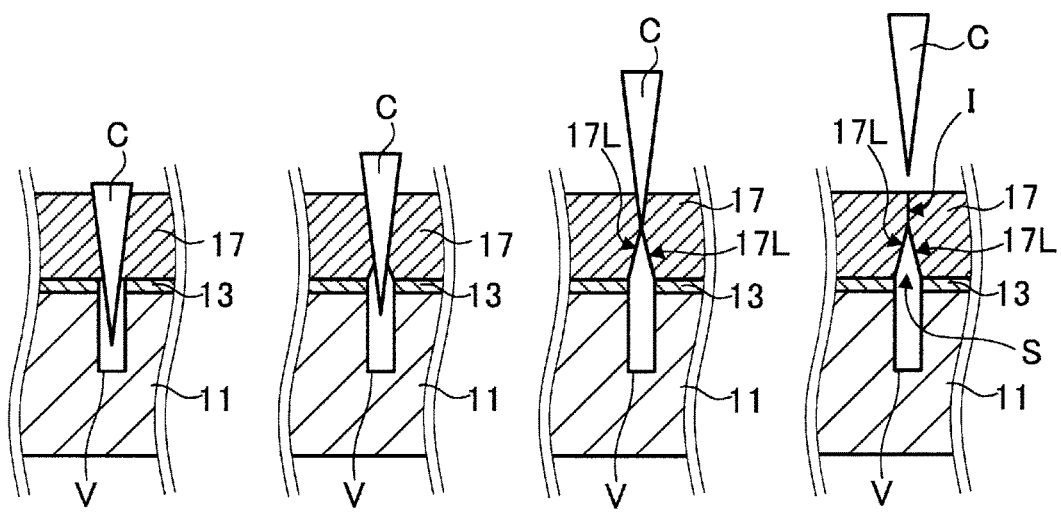
FIGS. 3a and 3d are schematic partial enlarged cross-sectional views depicting each of four steps using a blade in Process (D) shown in FIG. 2d, respectively.

Process (D) will now be described in detail with reference to FIG. 3a to FIG. 4f. The blade C can be inserted from the top surface (15S) of the wavelength converting layer 15P into the grid-like groove V at the substantially right angle with reference to the top surface 11T of the transparent substrate 11, and thereby the wavelength converting layer 15P can be divided into the plurality of wavelength converting chips 17 as shown in FIG. 3a. When the blade C begins to be pulled along the substantially reversed route with respect to the above-described inserting route, each of spaces may begin to remain between the adjacent wavelength converting chips 17, respectively, because the wavelength converting layer 15P is strongly attached on the top surface 13T of the dichroic filter 13 as shown in FIG. 3b.

When the blade C is further pulled along the substantially reversed route, each of spaces may remain between the adjacent wavelength converting chips 17, respectively, and each of the side surfaces 17L of the adjacent wavelength converting chips 17 may begin to contact with respect to each other as shown in FIG. 3c. When the blade C finishes being pulled along the substantially reversed route, each of the spaces S can remain between the adjacent wavelength converting chips 17, respectively, and each of the side surfaces 17L of the adjacent wavelength converting chips 17 can become the boundary I, respectively, as shown in FIG. 3d.

In the above-described Process (d), the wavelength converting layer 15P can also be divided into the plurality of wavelength converting chips 17 by scanning a laser beam on the wavelength converting layer 15P, for example, by partially sublimating the wavelength converting layer 15P by scanning an ultraviolet laser beam on the top surface 15S of the wavelength converting layer 15P. As shown in FIG. 4a, when the laser beam, for example, having approximately 5 percentages of a maximum power is scanned on the top surface (15S) of the wavelength converting layer 15P, the boundary I can be formed into each of the wavelength converting chips 17 by lineally sublimating the top surface (15S) of the wavelength converting layer 15P.

Next, when the laser beam, for example, having approximately 20 percentages of the maximum power is scanned at a substantially same position as the above-described top surface (15S) of the wavelength converting layer 15P, a small bore H can be formed under each of the boundaries I of the wavelength converting chips 17 by lineally sublimating the substantially same position as the top surface (15S) of the wavelength converting layer 15P as shown in FIG. 4b.

Then, when the laser beam, for example, having approximately 40, 60 and 80 percentages of the maximum power is scanned at the substantially same position as the above-described top surface (15S) of the wavelength converting layer 15P in incremental steps, respectively, the small bore H can be enlarged under each of the boundaries I of the wavelength converting chips 17 by lineally sublimating the substantially same position as the top surface (15S) of the wavelength converting layer 15P as shown in FIGS. 4c, 4d and 4e, respectively.

Finally, the wavelength converting layer 15P can be divided into the plurality of wavelength converting chips 17 by lineally sublimating the substantially same position as the top surface (15S) of the wavelength converting layer 15P as shown in FIG. 4f, when the laser beam, for example, having approximately 100 percentages of the maximum power is scanned at the substantially same position as the top surface (15S) of the wavelength converting layer 15P.

Thereby, each of the spaces S can continuously remain on the grid-like groove V between the adjacent wavelength converting chips 17, respectively, and each of the side surfaces 17L of the adjacent wavelength converting chips 17 can become the boundary I between the top surface (15S) of the wavelength converting layer 15P and a respective one of the spaces S. When the wavelength converting layer 15P is heat-solidified, the solidifying process may be carried out after the process shown in FIG. 4F, and also can be carried out in an additional process between the processes shown in FIG. 2c and FIG. 2d as described above. In this case, because a mark 15P of the above-described wavelength converting layer 15P becomes 15, the mark 15 in the manufacturing processes can include the mark 15P.

According to the above-described manufacturing methods, the grid-like groove V can be formed into the transparent substrate 11 from direction of the top surface 11T via the dichroic filter 13. Accordingly, when the plurality of wavelength converting chips 17 are formed by cutting the wavelength converting layer 15P using the blade C, this manufacturing method can prevent a gall of a cutting edge of the blade C, because the cutting edge of the blade C may not contact with the transparent substrate 11. Additionally, when the plurality of wavelength converting chips 17 are formed by cutting the wavelength converting layer 15P using the laser beam, the manufacturing method can prevent the laser beam from a damage of the transparent substrate 11, and also can enable the laser machine to facilitate controls such as a light-emission, a light-rest and the like of the laser beam by detecting existence or non-existence of reflections of the laser beam using the grid-like groove V. Therefore, the disclosed subject matter can provide methods for efficiently manufacturing the above-described wavelength converting devices with high accuracy.

Here, an exemplary embodiment of a lighting unit using the wavelength converting device 10 as a transmission type will now be described with reference to FIG. 5. The lighting unit 30 using the wavelength converting device 10 can include: a laser device 31 configured to emit a laser beam 31L; a Micro Electro Mechanical System (MEMS) mirror 33 having a reflective surface R configured to rotate in two-axis directions intersecting at a substantially right angle, being located adjacent the laser device 31, the reflective surface R facing the laser device 31 and receiving the laser beam 31L; the incident surface 11S of the wavelength converting device 10 facing the reflective surface R of the MEMS mirror 33; an optical lens 37 facing the light-emitting surface 15S of the wavelength converting device 10; and a controller 35 having an input 35IN configured to control the laser device 31 in order to be able to emit the laser beam 31L toward the reflective surface R of the MEMS mirror 33, and configured to control the reflective surface R of the MEMS mirror 33 in order to be able to reflect the laser beam 31L received from the laser device 31 toward the incident surface 11S of the wavelength converting device 10.

Patent document No. 4 discloses an exemplary MEMS mirror 33, exemplary methods for controlling the MEMS mirror 33 to emit various color lights including a substantially white color tone and exemplary lighting units such as a vehicle headlight. The input 35IN of the MEMS mirror 33 can be used as a control signal for the lighting units such as the vehicle headlight, which may provide favorable light distribution patterns for drivers in accordance with various conditions such as a road, oncoming vehicles, etc. Detail descriptions are disclosed in Patent document No. 4, which is owned by Applicant of this subject matter, and therefore will be abbreviated here.

In the lighting unit 30, when the laser device 31 includes the blue laser diode emitting the laser beam 31L having blue color and when the wavelength converting layer 15 includes the yellow phosphor, the wavelength converting device 10 can emit the mixture light having the substantially white color tone from the light-emitting surface 15S of the wavelength converting layer 15 as describe above. In this case, a diameter of the laser beam 31L can be smaller than each of chip incident surfaces 17I of the wavelength converting chips 17 so that the laser beam 31L can enter into only a respective one of the chip incident surfaces 17I of the wavelength converting chips 17.

In addition, the controller 35 can enable the laser device 31 to pulse-drives a pulsed laser beam 31L and also can enable the MEMS mirror 33 to sequentially rotate the reflective mirror R, while the reflective mirror R is synchronized with the pulsed laser beam 31L, so that the reflective mirror R can scan the pulsed laser beam on the respective one of the chip incident surfaces 17I of the wavelength converting chips 17. The light-emitting surface 15S can emit the mixture light having a high light-emitting efficiency and a high color uniformity toward the optical lens 37 by using each of the side surfaces 17L of the adjacent wavelength converting chips 17 as the reflector, which enlarges toward the light-emitting surface 15S of the wavelength converting layer 15, so that the mixture light may not leak from the respective one of the wavelength converting chips 17 as described above.

When the mixture light is emitted from the one of the adjacent wavelength converting chips 17 and when the mixture light is not emitted from the other of the adjacent wavelength converting chips 17, because the mixture light emitted from the one of the adjacent wavelength converting chips 17 does not leak toward the other of the adjacent wavelength converting chips 17, the wavelength converting device 10 can enable the mixture light to be emitted from the intended chip of the wavelength converting chips 17.

Moreover, even when the pulsed laser beam 31L reaches the outer side surface of the grid-like groove V, because the pulsed laser beam 31L reached on the outer side surface of the grid-like groove V may totally reflect on the outer side surface of the grid-like groove V toward the respective one of the wavelength converting chips 17, the wavelength converting device 10 can enable the pulsed laser beam 31L to be emitted from the intended chip of the wavelength converting chips 17 as the mixture light via the light-emitting surface 15S of the wavelength converting layer 15 toward the optical lens 37.

Furthermore, because each of the adjacent wavelength converting chips 17 is divided by the boundary I between the light-emitting surface 15S and the boundary end E, which is located in the wavelength converting layer 15, when the pulsed laser beam 31L is entered from the incident surface 11S into the transparent substrate 11, the wavelength converting device 10 can enable the mixture light to be emitted from the light-emitting surface 15S at the high light-emitting efficiency and the high color uniformity toward the optical lens 37 while the mixture light directed toward the transparent substrate 11 returns toward the light-emitting surface 15S with the dichroic filter 13 so that each of the variations of the light-emitting intensity and colure tone may not occur even at the boundary end E. Thus, the lighting unit 30 can provide various favorable light distribution patterns having a desirable color light via the optical lens 37 toward large arrow shown in FIG. 5.

Figure 6:
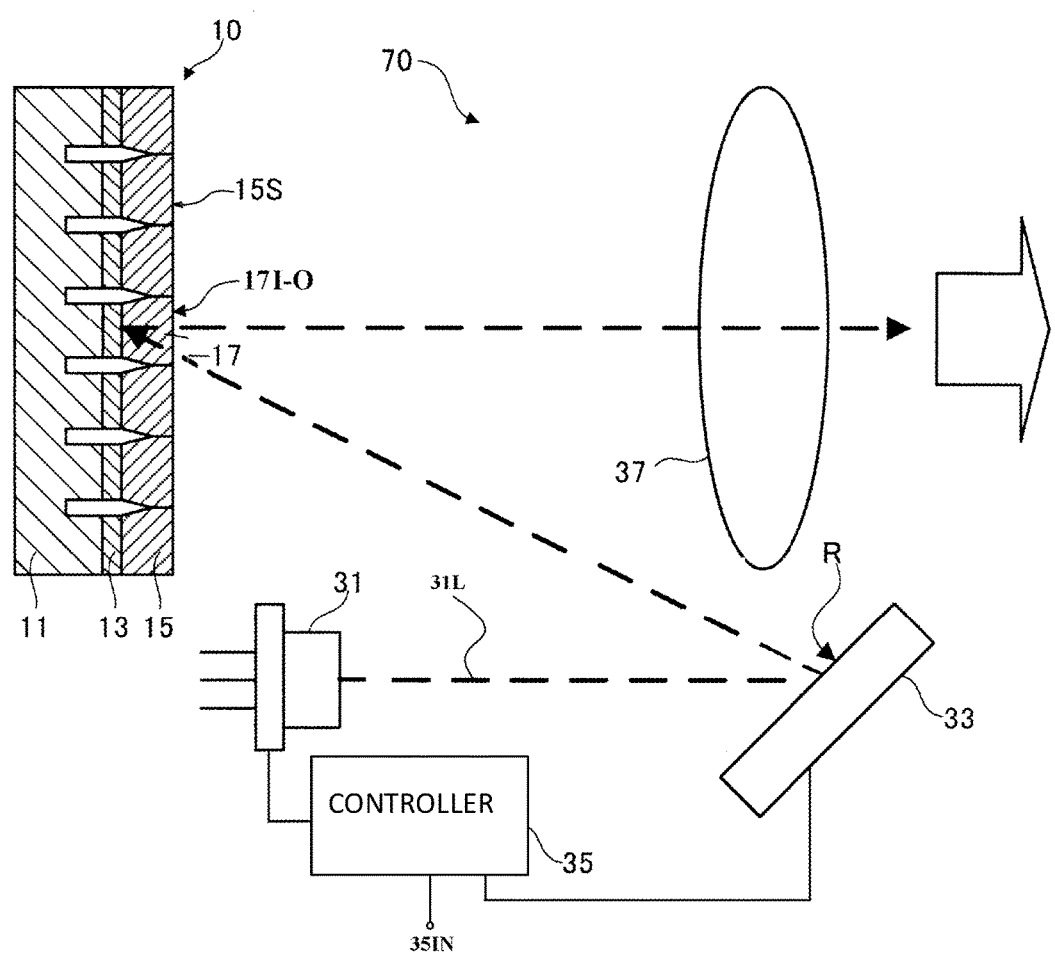
FIG. 6 is a schematic structural view depicting a second exemplary embodiment of the lighting unit using the wavelength converting device made in accordance with principles of the disclosed subject matter.

A second exemplary embodiment of the lighting unit using the wavelength converting device 10 as a reflective type will now be described with reference to FIG. 6. Differences between the second embodiment and the first embodiment relates to the wavelength converting device 10 using as the reflective type device in the second embodiment although the wavelength converting device 10 is used as the transmission type device for the light unit 30 in the first embodiment.

Specifically, the lighting unit 70 using the wavelength converting device 10 can include: the laser device 31 configured to emit the laser beam 31L; the MEMS mirror 33 having the reflective surface R configured to rotate in the two-axis directions intersecting at a substantially right angle, being located adjacent the laser device 31, the reflective surface R facing the laser device 31 and receiving the laser beam 31L; the light-emitting surface 15S of the wavelength converting device 10 facing the reflective surface R of the MEMS mirror 33; the optical lens 37 facing the light-emitting surface 15S of the wavelength converting device 10; and the controller 35 having the input 35IN configured to control the laser device 31 in order to be able to emit the laser beam 31L toward the reflective surface R of the MEMS mirror 33, and configured to control the reflective surface R of the MEMS mirror 33 in order to be able to reflect the laser beam 31L received from the laser device 31 toward the light-emitting surface 15S of the wavelength converting device 10

Also in the lighting unit 70, when the laser device 31 includes the blue laser diode emitting the laser beam 31L having the blue color and when the wavelength converting layer 15 includes the yellow phosphor, the wavelength converting device 10 can emit the mixture light having the substantially white color tone from the light-emitting surface 15S of the wavelength converting layer 15 in common with the first embodiment. The diameter of the laser beam 31L can be smaller than each of chip incident surfaces 17I-O of the wavelength converting chips 17 so that the laser beam 31L can enter into only the respective one of the chip incident surfaces 17I-O of the wavelength converting chips 17.

In addition, the controller 35 can enable the laser device 31 to pulse-drives the pulsed laser beam 31L and also can enable the MEMS mirror 33 to sequentially rotate the reflective mirror R, while the reflective mirror R is synchronized with the pulsed laser beam 31L, so that the reflective mirror R can scan the pulsed laser beam on the respective one of the chip incident surfaces 17I-O of the wavelength converting chips 17. The light-emitting surface 15S of the wavelength converting device 10 can emit the mixture light having a high light-emitting efficiency and a high color uniformity as a reflective light toward the optical lens 37 by using each of the side surfaces 17L of the adjacent wavelength converting chips 17 as the reflector, which enlarges toward the light-emitting surface 15S of the wavelength converting layer 15, so that the mixture light may not leak from the respective one of the wavelength converting chips 17.

Moreover, when the mixture light is emitted from the one of the adjacent wavelength converting chips 17 as the reflective light and when the mixture light is not emitted from the other of the adjacent wavelength converting chips 17, because the mixture light emitted from the one of the adjacent wavelength converting chips 17 does not leak toward the other of the adjacent wavelength converting chips 17, the wavelength converting device 10 can enable the mixture light to be emitted from the intended chip of the wavelength converting chips 17 as the reflective light.

Furthermore, because each of the adjacent wavelength converting chips 17 is divided by the boundary I between the light-emitting surface 15S and the boundary end E, which is located in the wavelength converting layer 15, when the pulsed laser beam 31L is entered from the light-emitting surface 15S into the wavelength converting layer 15, the wavelength converting device 10 can enable the mixture light to be emitted from the light-emitting surface 15S at the high light-emitting efficiency and the high color uniformity as the reflective light toward the optical lens 37 while the mixture light directed toward the transparent substrate 11 returns toward the light-emitting surface 15S with the dichroic filter 13 so that each of the variations of the light-emitting intensity and colure tone may not occur even at the boundary end E. Thus, the lighting unit 70 can also provide various favorable light distribution patterns having the desirable color light via the optical lens 37 toward large arrow shown in FIG. 6 in common with the first embodiment.

Figure 7A:
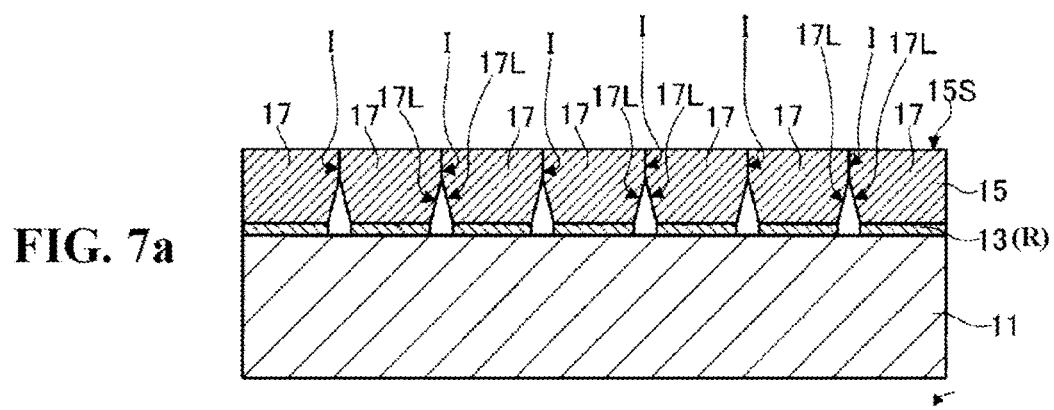
FIGS. 7a and 7b are schematic cross-sectional view showing two variations of the wavelength converting device used for the lighting unit of FIG. 6, respectively.
Figure 7B:
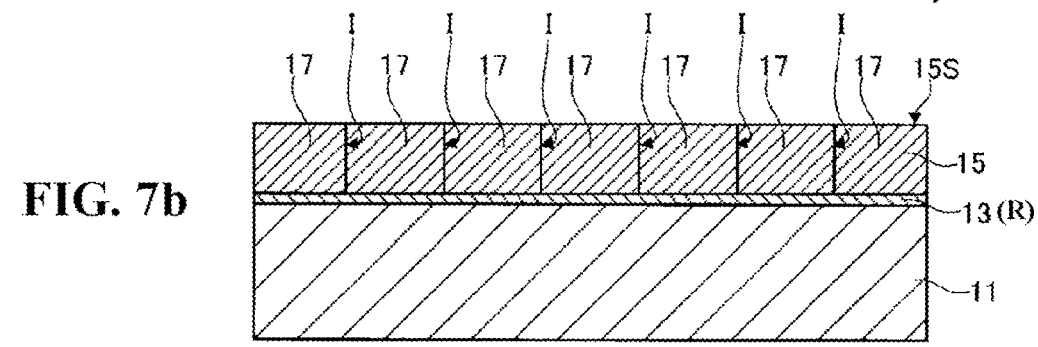
Figure 8A:
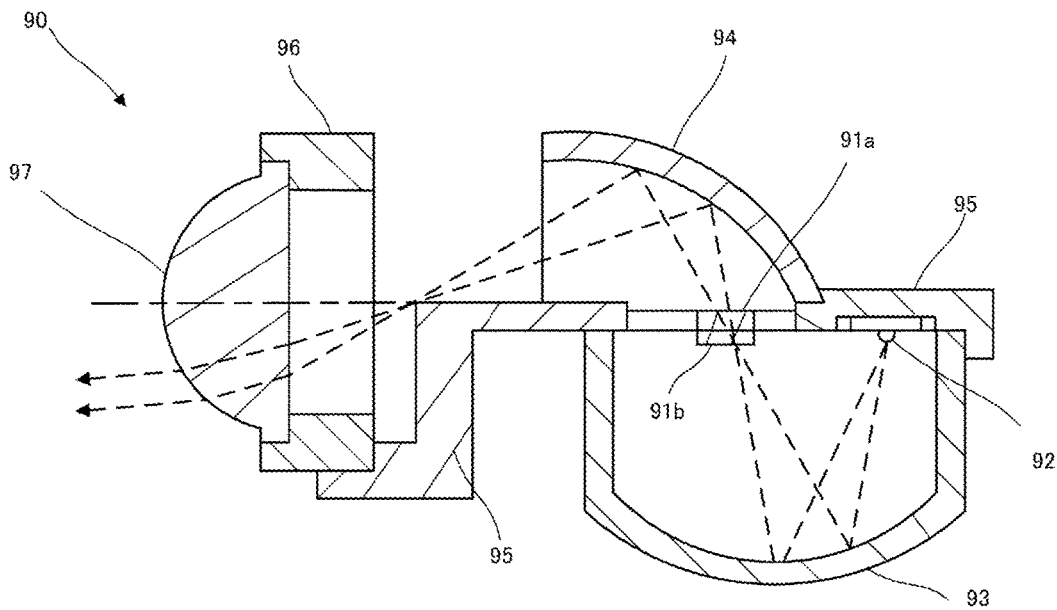
FIG. 8a is a schematic cross-sectional view depicting a conventional headlight.
Figure 8B:
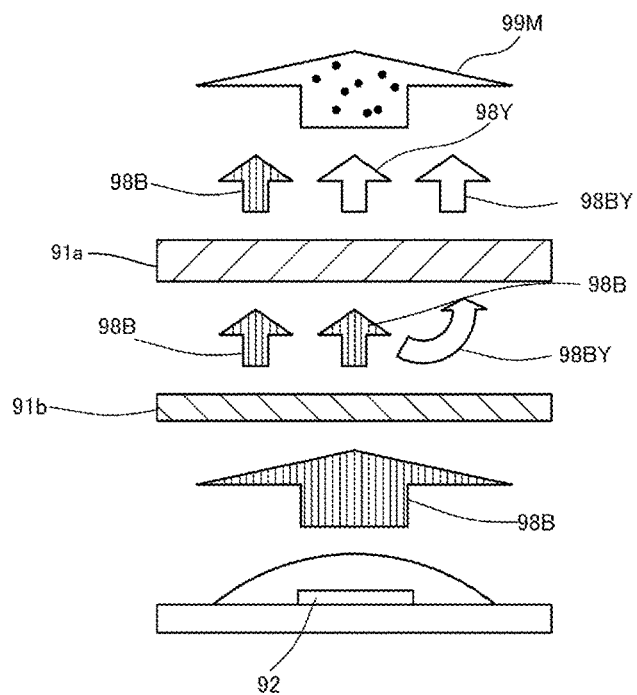
FIG. 8b is a schematic explanatory view depicting a method for emitting a mixture light having a substantially white color tone in the conventional headlight.
Figure 9:
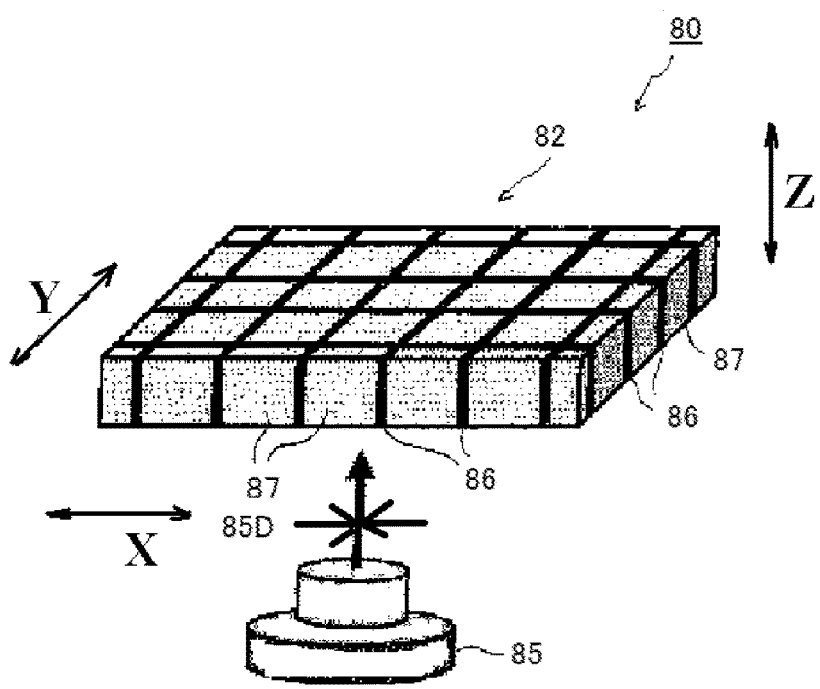
FIG. 9 is a schematic explanatory perspective view showing a conventional semiconductor light-emitting apparatus emitting the mixture light having the substantially white color tone.

In the second embodiment, because the dicroic filter 13 is used only as a reflective operation, the dicroic filer 13 may replace with a reflective layer 13R, which is made by forming a metallic material such as an aluminum layer on the top surface 11T of the transparent substrate 11. Additionally, the grid-like groove V can be removed from the transparent substrate 11 as shown in FIG. 7a, and also each of the spaces S of the adjacent wavelength converting chips 17 can be removed from the wavelength converting layer 15 and either one of the dicroic filter 13 or the reflective layer 13R as shown in FIG. 7b.

As described above, the wavelength converting device 10 may emit various mixture lights including a substantially white light from the light-emitting surface 15S of the wavelength converting layer 15 in accordance with the additive color mixture ratio of the excited red, green and blue lights. Thus, the disclosed subject matter can provide the wavelength converting devices, which can provide various desirable light distribution patterns by scanning the laser beam using the movable mirror, and also can provide lighting units using such the devices that can also emit a large amount of light intensity having a high light-efficiency, and which can emit various color lights having a high color uniformity in order to be able to use for a stage light, a street light, a projector, a vehicle light, a spot light, etc.

Various modifications of the above disclosed embodiments can be made without departing from the spirit and scope of the presently disclosed subject matter. For example, cases where the transparent resin such a silicon resin is used for the above-described wavelength converting layer 15 are described. However, the wavelength converting layer 15 cannot be limited to the transparent resin and can be formed in various transparent materials such as a glass, a ceramic, etc.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A wavelength converting device, comprising:
   a transparent substrate having an incident surface, a substrate top surface and a substrate side surface formed in a substantially planar shape, and including a grid-like groove into the transparent substrate from a direction of the substrate top surface, and the grid-like groove extending along the substrate side surface;
   a dichroic filter having a filter top surface disposed on the substrate top surface of the transparent substrate; and
   a wavelength converting layer having a light-emitting surface disposed on the filter top surface of the dichroic filter, and divided into a plurality of wavelength converting chips each having a side surface and a boundary end located in the wavelength converting layer, each of the side surfaces of the adjacent wavelength converting chips substantially contacting with respect to each other, and therefore forming a boundary between the light-emitting surface of the wavelength converting layer and the boundary end, and each of the side surfaces of the adjacent wavelength converting chips facing with respect to each other, separating between the boundary end and the grid-like groove of the transparent substrate, and therefore forming a space between the boundary end and the grid-like groove of the transparent substrate, and the space enlarging from the boundary end toward the grid-like groove of the transparent substrate in an extending direction of the grid-like groove.

2. The wavelength converting device according to claim 1, wherein the boundary between the side surfaces of the adjacent wavelength converting chips extends toward the transparent substrate at a substantially right angle with respect to the transparent substrate.

3. A method for manufacturing the wavelength converting device according to claim 2 comprising:
   providing the transparent substrate and forming the dichroic filter on the top surface of the transparent substrate;
   forming the grid-like groove into the transparent substrate from direction of the top surface via the dichroic filter;
   attaching the wavelength converting layer on the top surface of the dichroic filter; and
   cutting the wavelength converting layer on the dichroic filter into the grid-like groove, and dividing the wavelength converting layer into the plurality of wavelength converting chips.

4. The wavelength converting device according to claim 1, wherein the transparent substrate includes at least one of a sapphire and a glass.

5. A method for manufacturing the wavelength converting device according to claim 4 comprising:
   providing the transparent substrate and forming the dichroic filter on the top surface of the transparent substrate;
   forming the grid-like groove into the transparent substrate from direction of the top surface via the dichroic filter;
   attaching the wavelength converting layer on the top surface of the dichroic filter; and
   cutting the wavelength converting layer on the dichroic filter into the grid-like groove, and dividing the wavelength converting layer into the plurality of wavelength converting chips.

6. The wavelength converting device according to claim 1, wherein the wavelength converting layer includes at least one of an yellow phosphor, a red phosphor, a green phosphor and a blue phosphor.

7. A method for manufacturing the wavelength converting device according to claim 1 comprising:
   providing the transparent substrate and forming the dichroic filter on the top surface of the transparent substrate;
   forming the grid-like groove into the transparent substrate from direction of the top surface via the dichroic filter;
   attaching the wavelength converting layer on the top surface of the dichroic filter; and
   cutting the wavelength converting layer on the dichroic filter into the grid-like groove, and dividing the wavelength converting layer into the plurality of wavelength converting chips.

8. A lighting unit using the wavelength converting device according to claim 1, further comprising:
   a laser device configured to emit a laser beam, and a diameter of the laser beam emitted from the laser device being smaller than each size of chip incident surfaces of the wavelength converting chips of the wavelength converting device;
   a Micro Electro Mechanical System (MEMS) mirror having a reflective surface configured to rotate in two-axis directions intersecting at a substantially right angle, and being located adjacent the laser device, the reflective surface of the MEMS mirror facing the laser device, receiving the laser beam in an operation of the laser device, facing the incident surface of the wavelength converting device, and reflecting the laser beam received from the laser device toward the incident surface of the wavelength converting device, and thereby the laser beam emitted from the laser device being possible to enter into a respective one of the chip incident surfaces of the wavelength converting chips via the reflective surface of the MEMS mirror;
   an optical lens facing the light-emitting surface of the wavelength converting device, receiving the laser beam from the light-emitting surface of the wavelength converting device and projecting the laser beam in an opposite direction of the wavelength converting device; and
   a controller configured to control the laser device for forming the laser beam in a pulsed shape and for emitting the pulsed laser beam toward the reflective surface of the MEMS mirror, and configured to control the reflective surface of the MEMS mirror for scanning the pulsed laser beam received from the laser device toward the respective one of the chip incident surfaces of the wavelength converting chips.

9. A lighting unit including the semiconductor light source apparatus according to claim 1, further comprising:
   a laser device configured to emit a laser beam, and a diameter of the laser beam emitted from the laser device being smaller than each size of chip incident/light-emitting surfaces of the wavelength converting chips of the wavelength converting device;
   a Micro Electro Mechanical System (MEMS) mirror having a reflective surface configured to rotate in two-axis directions intersecting at a substantially right angle, and being located adjacent the laser device, the reflective surface of the MEMS mirror facing the laser device, receiving the laser beam in an operation of the laser device, facing the light-emitting surface of the wavelength converting device, and reflecting the laser beam received from the laser device toward the light-emitting surface of the wavelength converting device, and thereby the laser beam emitted from the laser device being possible to enter into a respective one of the chip incident/light-emitting surfaces of the wavelength converting chips via the reflective surface of the MEMS mirror;
   an optical lens facing the light-emitting surface of the wavelength converting device, receiving the laser beam from the light-emitting surface of the wavelength converting device and projecting the laser beam in an opposite direction of the wavelength converting device; and
   a controller configured to control the laser device for forming the laser beam in a pulsed shape and for emitting the pulsed laser beam toward the reflective surface of the MEMS mirror, and configured to control the reflective surface of the MEMS mirror for scanning the pulsed laser beam received from the laser device toward the respective one of the chip incident/light-emitting surfaces of the wavelength converting chips.

10. A wavelength converting device, comprising:
   a transparent substrate having an incident surface, a substrate top surface and a substrate side surface formed in a substantially planar shape;

either a dichroic filter having a filter top surface or a reflective layer having a reflective top surface disposed on the substrate top surface of the transparent substrate; and a wavelength converting layer having a light-emitting surface disposed on either the filter top surface of the dichroic filter or the reflective top surface of the reflective layer, and divided into a plurality of wavelength converting chips each having a side surface and a boundary end located between the light-emitting surface of the wavelength converting layer and either the filter top surface of the dichroic filter or the reflective top surface of the reflective layer, each of the side surfaces of the adjacent wavelength converting chips substantially contacting with respect to each other between the light-emitting surface of the wavelength converting layer and the boundary end, and therefore forming a boundary between the light-emitting surface of the wavelength converting layer and the boundary end, the boundary extending along the substrate side surface of the transparent substrate in a grid-like shape, and separating between the light-emitting surface of wavelength converting layer and the boundary end.

11. The wavelength converting device according to claim 10, further comprising:
a space located between the boundary end and the substrate top surface of the transparent substrate, and enlarging from the boundary end toward the light-emitting surface of wavelength converting layer in an extending direction of the boundary.

12. The wavelength converting device according to claim 3, wherein the boundary between the side surfaces of the adjacent wavelength converting chips extends toward the transparent substrate at a substantially right angle with respect to the transparent substrate.

13. The wavelength converting device according to claim 11, wherein the transparent substrate includes at least one of a sapphire and a glass.

14. The wavelength converting device according to claim 11, wherein the wavelength converting layer includes at least one of an yellow phosphor, a red phosphor, a green phosphor and a blue phosphor.

15. A lighting unit using the wavelength converting device according to claim 11, further comprising:
a laser device configured to emit a laser beam, and a diameter of the laser beam emitted from the laser device being smaller than each size of chip incident/light-emitting surfaces of the wavelength converting chips of the wavelength converting device;
a Micro Electro Mechanical System (MEMS) mirror having a reflective surface configured to rotate in two-axis directions intersecting at a substantially right angle, and being located adjacent the laser device, the reflective surface of the MEMS mirror facing the laser device, receiving the laser beam in an operation of the laser device, facing the light-emitting surface of the wavelength converting device, and reflecting the laser beam received from the laser device toward the light-emitting surface of the wavelength converting device, and thereby the laser beam emitted from the laser device being possible to enter into a respective one of the chip incident/light-emitting surfaces of the wavelength converting chips via the reflective surface of the MEMS mirror;
an optical lens facing the light-emitting surface of the wavelength converting device, receiving the laser beam from the light-emitting surface of the wavelength converting device and projecting the laser beam in an opposite direction of the wavelength converting device; and
a controller configured to control the laser device for forming the laser beam in a pulsed shape and for emitting the pulsed laser beam toward the reflective surface of the MEMS mirror, and configured to control the reflective surface of the MEMS mirror for scanning the pulsed laser beam received from the laser device toward the respective one of the chip incident/light-emitting surfaces of the wavelength converting chips.

16. The wavelength converting device according to claim 10, wherein the boundary between the side surfaces of the adjacent wavelength converting chips extends toward the transparent substrate at a substantially right angle with respect to the transparent substrate.

17. A lighting unit using the wavelength converting device according to claim 16, further comprising:
a laser device configured to emit a laser beam, and a diameter of the laser beam emitted from the laser device being smaller than each size of chip incident/light-emitting surfaces of the wavelength converting chips of the wavelength converting device;
a Micro Electro Mechanical System (MEMS) mirror having a reflective surface configured to rotate in two-axis directions intersecting at a substantially right angle, and being located adjacent the laser device, the reflective surface of the MEMS mirror facing the laser device, receiving the laser beam in an operation of the laser device, facing the light-emitting surface of the wavelength converting device, and reflecting the laser beam received from the laser device toward the light-emitting surface of the wavelength converting device, and thereby the laser beam emitted from the laser device being possible to enter into a respective one of the chip incident/light-emitting surfaces of the wavelength converting chips via the reflective surface of the MEMS mirror;
an optical lens facing the light-emitting surface of the wavelength converting device, receiving the laser beam from the light-emitting surface of the wavelength converting device and projecting the laser beam in an opposite direction of the wavelength converting device; and
a controller configured to control the laser device for forming the laser beam in a pulsed shape and for emitting the pulsed laser beam toward the reflective surface of the MEMS mirror, and configured to control the reflective surface of the MEMS mirror for scanning the pulsed laser beam received from the laser device toward the respective one of the chip incident/light-emitting surfaces of the wavelength converting chips.

18. The wavelength converting device according to claim 10, wherein the transparent substrate includes at least one of a sapphire and a glass.

19. The wavelength converting device according to claim 10, wherein the wavelength converting layer includes at least one of an yellow phosphor, a red phosphor, a green phosphor and a blue phosphor.

20. A lighting unit using the wavelength converting device according to claim 10, further comprising:
a laser device configured to emit a laser beam, and a diameter of the laser beam emitted from the laser device being smaller than each size of chip incident/light-emitting surfaces of the wavelength converting chips of the wavelength converting device;

a Micro Electro Mechanical System (MEMS) mirror having a reflective surface configured to rotate in two-axis directions intersecting at a substantially right angle, and being located adjacent the laser device, the reflective surface of the MEMS mirror facing the laser device, receiving the laser beam in an operation of the laser device, facing the light-emitting surface of the wavelength converting device, and reflecting the laser beam received from the laser device toward the light-emitting surface of the wavelength converting device, and thereby the laser beam emitted from the laser device being possible to enter into a respective one of the chip incident/light-emitting surfaces of the wavelength converting chips via the reflective surface of the MEMS mirror;

an optical lens facing the light-emitting surface of the wavelength converting device, receiving the laser beam from the light-emitting surface of the wavelength converting device and projecting the laser beam in an opposite direction of the wavelength converting device; and a controller configured to control the laser device for forming the laser beam in a pulsed shape and for emitting the pulsed laser beam toward the reflective surface of the MEMS mirror, and configured to control the reflective surface of the MEMS mirror for scanning the pulsed laser beam received from the laser device toward the respective one of the chip incident/light-emitting surfaces of the wavelength converting chips.

* * * * *